Feb. 4, 1969 P. A. LORD ET AL 3,426,335

THIN FILM ASSOCIATIVE MEMORY

Filed Aug. 31, 1966 Sheet 1 of 4

INVENTORS
PHILIP A. LORD
MITCHELL P. MARCUS

BY Ronald J. Clark
ATTORNEY

United States Patent Office 3,426,335
Patented Feb. 4, 1969

3,426,335
THIN FILM ASSOCIATIVE MEMORY

Philip A. Lord, Vestal, and Mitchell P. Marcus, Binghamton, N.Y., assignors to International Business Machines Corp., Armonk, N.Y., a corporation of New York Filed Aug. 31, 1966, Ser. No. 576,400
U.S. Cl. 340—174 12 Claims
Int. Cl. G11b *5/00*

ABSTRACT OF THE DISCLOSURE

A thin film associative memory in which each thin film element is a microwave absorption element which passes a fixed level of interrogation signal when set to one stable state. The signal levels resulting from interrogation of all bit positions are summed according to words. The highest output corresponds to the word being sought.

This invention relates to associative memories and, more particularly, to associative memories wherein a plurality of tag or identification portions of the stored word are compared simultaneously.

Associative memories are well known in the prior art and consists of a storage matrix operating to store a plurality of words. The word is schematically divided into a tag portion and a record portion. This division is not a physical division. More particularly, the particular storage word associated with each memory word position is not physically divided into a first and a second half, but rather selection means are provided whereby a certain sequential group of bits or a group of scattered bits are selected as the comparison factor. A successful compare operation indicates that a particular word does in fact contain the tag furnished by an associated CPU as the word which the CPU desires to process When the successful tag compare operation is completed, the entire word is then transferred to the associated CPU. One of the problems associated with an associative memory is that the compare operation is sequential in operation. More specifically, each word is brought into the compare operation with the tag indicia furnished by the associated CPU. The tag portion of each word is compared with the tag indicia furnished by the CPU. It is easy to see that in a large capacity associative memory the searching for a single word in that memory would take a considerably long time.

As an aid in speeding up the searching of an associative memory, it is indeed possible to handle a group of storage words in parallel. However, this would require an additional hardware register for each additional word to be handled in parallel. It is easily seen that this method of increasing the processing speed of an associative memory is extremely costly in terms of hardware circuits required.

One feature of the instant invention is that the associative memory, constructed with thin film structures employing the microwave absorption technique, operates to search a plurality of tag portions in parallel. More specifically, the tag indicia is originally placed in a tag entry circuit having a plurality of storage positions therefor, and an equal plurality of perturb circuits which are energized according to the content of the storage positions. The perturb circuits are in turn connected in such a way to magnetically alter the operating condition of a plurality of thin film structures which contain the tag portion of the storage word. A source of microwaves feeds a plurality of bit lines, each of which thread a plurality of microwave structures collectively containing the tag portion of the storage word. Each of the bit lines is terminated in a threshold amplifier and second perturb circuit. Each of the first perturb lines is placed orthogonal to the bit lines, and each perturb line is coupled with a plurality of bit lines. In operation, the tag entry circuit assumes the configuration of the desired tag indicia. This is characterized by the energization of the corresponding first perturb circuits and their transmission of a perturb pulse onto corresponding perturb lines. The magnetic field created in response to these perturb signals alters or modulates the operating characteristic of each thin film structure which interacts therewith. The changed operating characteristics affect the power level of microwave signals passing down the bit lines associated with each group of perturb lines. The threshold amplifier is set to recognize a signal wherein each of the thin film structures associated therewith passes the maximum amount of microwave energy. The amount of energy is accumulated or literally added for each thin film structure which passes its maximum amount of microwave energy. For that thin film structure which is altered in such a way as to absorb more microwave energy, the values of sequential thin film structures on the same bit line literally subtract. The values transmitted from each thin film structure generates a pedestal which triggers the threshold amplifier. The correct storage word is selected when the threshold amplifier indicates a successful compare operation between the tag position of the storage word and the tag indicia held in the tag entry circuit. When this compare operation is successful, the corresponding second perturb circuit is activated, causing a readout of the remaining portion of the storage word.

The threshold amplifier may be replaced, in a separate embodiment, by a perturb circuit having a microwave output absorption capacity substantially equal to the several incremental increases caused by a successful compare operation.

It is an object of the instant invention to provide an associative memory which employs a plurality of thin film microwave absorption structures as storage elements, a microwave source and detector as means for simultaneously sensing the state of a plurality of elements, and a perturb line associated with each the storage elements for causing each element to alter its absorption capacity, depending on its current stable magnetic state.

It is another object of the instant invention to provide a microwave absorption, associative memory capable of performing its tag search operation in parallel for a portion of the memory.

It is an object of the instant invention to provide a microwave absorption, associative memory capable of simultaneously searching each tag portion of each word in the memory.

A second feature of the instant invention is its capability to search the tag portion of the storage word on variable content. Although it is normal operating procedure to fix the length of the tag portion of the storage word and to keep this length constant, it is sometimes desirable to address the associative memory on a smaller part of the tag portion. In order to accomplish this feature, the threshold associated with each of the threshold amplifiers must be adjusted to respond to the number of positions selected as the position being searched.

It is another object of the instant invention to provide a thin film, microwave absorption, associative memory having a variable length tag portion.

It is a further object of the instant invention to provide a thin film, microwave absorption, associative memory having an adjustable length tag portion.

It is a still further object of the instant invention to provide a thin film, microwave absorption, associative memory which employs a plurality of thin film structures as storage elements, a microwave source and threshold detector as a means for simultaneously sensing the state of a plurality of elements, a perturb line associated with each of the elements for causing each element to alter its absorption capacity depending on its then existing stable magnetic state and a select circuit for selecting a variable number of elements as a tag portion and for adjusting the threshold of the microwave detector according to the number of elements selected.

A third feature of the associative memory described herein is directed to added circuitry which enables the present invention to search its tag areas for the tag indicia which most closely resembles the tag indicia being searched. In this mode of operation the variable threshold associated with the threshold and perturb circuits is sequentially lowered by an amount equal to the current contribution from a single microwave structure in a string of structures furnishing a current pedestal to its respective threshold amplifier. In this manner it is possible to select out of a tag area having eight positions, an eight-out-of-eight successful operation, a seven-out-of-eight, six-out-of-eight, etc.

A fourth feature of the instant invention is to provide an additional means for sequentially activating each of the perturb output signals representing one of the positions in the tag entry circuit. In this manner all corresponding positions in the tag portion of the responsive storage words are simultaneously energized and the threshold level in the corresponding threshold and perturb circuit is now reduced to one level or a simple amplifier. When a disagreement is detected during any one readout, the perturb circuit associated therewith to read out its data signal is now disabled from ever providing such a readout signal. In succession, therefore, the remaining perturb circuits associated with the desired tag indicia are sequentially energized until the entire group of tag signals has been generated. During each of the generating periods associated with the tag word, certain of the amplifier and perturb circuits are disabled until at the end of the sequential scan of the tag indicia the desired amplifier perturber circuit is still energized thereby providing the readout signal of the associated data word.

Accordingly, it is an object of the instant invention to provide an improved thin film associated memory.

It is another object of the instant invention to provide a thin film associative memory which performs its compare operation with several tag words in parallel, but with only one compare responsive circuit.

It is another object of the instant invention to provide a thin film associative memory operating on the principles of microwave absorption whereby the compare operation is performed by the addition and subtraction of microwave voltage levels which are generated in response to the agreement or disagreement respectively of the desired tag indica and the present tag indicia of the word being searched.

It is a further object of the instant invention to provide a thin film associative memory wherein it is possible to expand and contract the tag area of the storage word upon which the compare operation is to be performed.

It is another object of the instant invention to provide a thin film associative memory operating upon the principles of microwave absorption which is able to recognize the closest match between the applied tag indicia and the tag word of a plurality of storage words.

It is another object of the instant invention to provide a thin film associative memory operating upon the principles of microwave absorption wherein the tag word being searched is sequentially compared one bit at a time with a plurality of corresponding positions in a tag entry circuit whereby a disagreement between corresponding bits causes the inhibiting of a corresponding bit readout circuit.

The foregoing and other objects, features and advantages of the invention will be apparent from the following more particular description of preferred embodiments of the invention, as illustrated in the accompanying drawings; wherein FIGS. 1*a* and 1*b* are a schematic diagram of one embodiment of a microwave absorption associative memory;

The same numerals are used in the several views to identify corresponding elements.

Figure 1A:
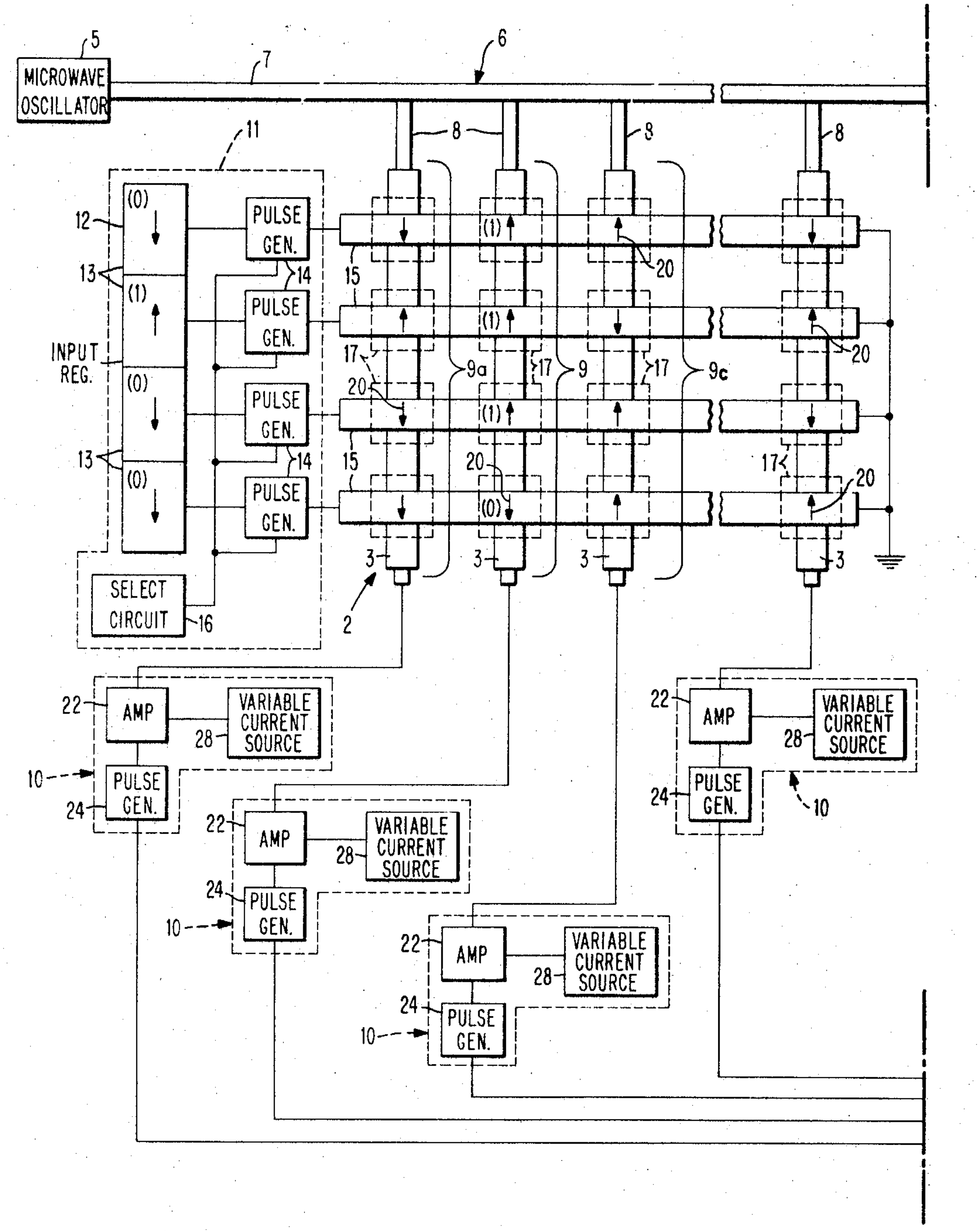
Figure 1B:
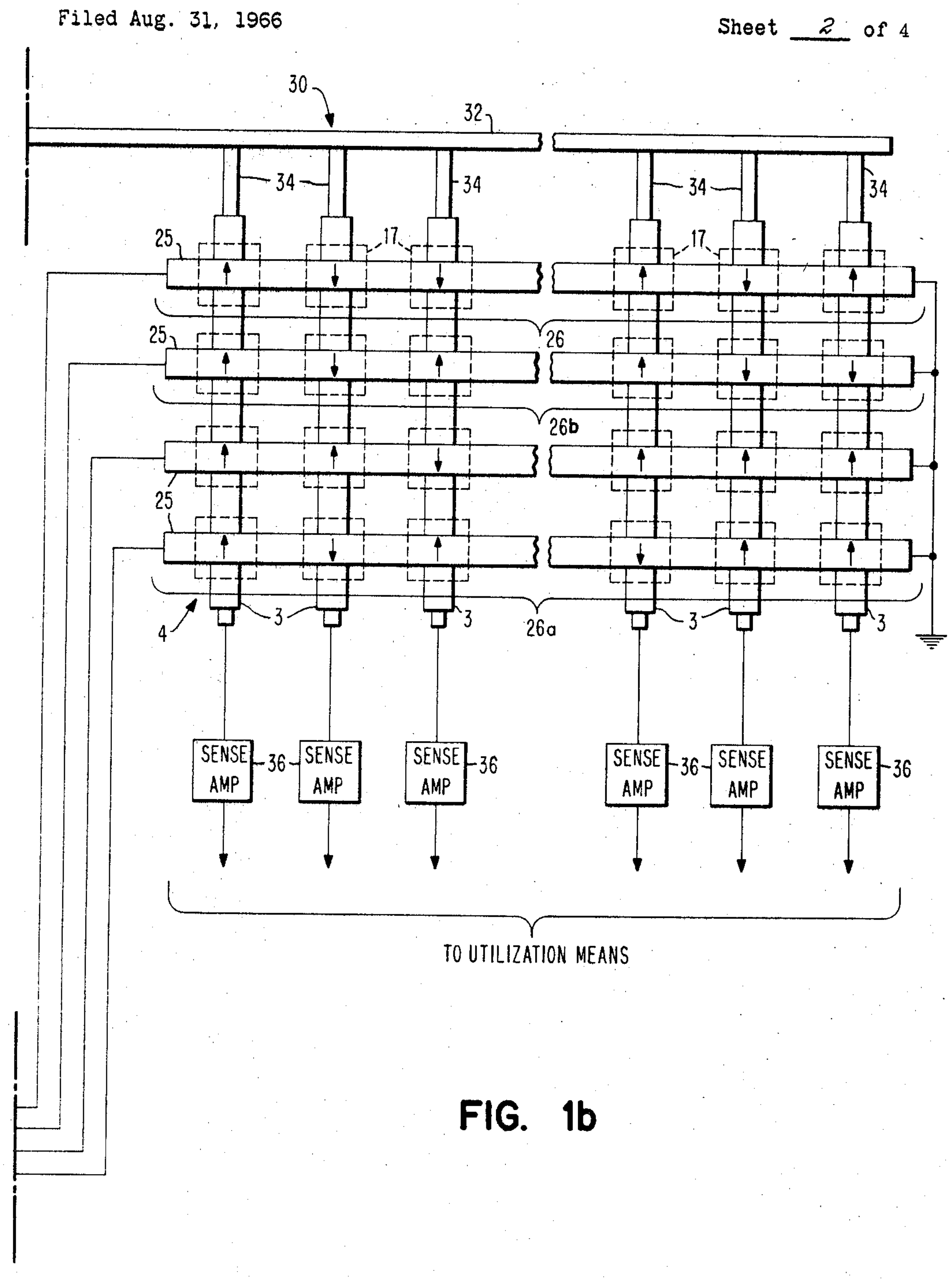

Referring to FIGS. 1*a* and 1*b*, there can be seen an illustrative view of an associative memory comprising a first plurality 2 of thin film elements 3 and a second plurality 4 of thin film elements 3. A representative thin film element 3 is described in greater detail in a U.S. patent application of Rodger L. Gamblin, filed Aug. 4, 1966, Ser. No. 570,366 and assigned to the assignee of the present invention. As completely described in this copending application, each memory element assumes either of two stable magnetic states representing a binary one condition or a binary zero condition.

An oscillator 5 or other similar device generates the microwave frequency for use throughout the remainder of the memory. A first microwave distribution network 6 includes a main transmission line 7 and a plurality of branch lines 8. Each of the branch lines threads a thin film element 3, one of which elements, as hereinafter more completely described, represents the tag portion 9 of a storage word. Each branch line 8 terminates in a respective tag recognition circuit 10. Standard practices are followed in equally dividing the microwave signal on the line 7 among the branch lines 8.

A tag input circuit 11 comprises an input register 12 having a plurality of positions 13 as a temporary storage means and a plurality of bi-directional pulse generators 14. Each of the generators 14 is responsive to a respective register position 13. A plurality of first perturb lines 15 are placed orthogonal to the branch lines 8 and each of the perturb lines 15 is connected to a respective pulse generator 14. Selection means 16 may also be included for selectively disabling certain of said pulse generators 14 when it is desired to employ a tag portion 9 having fewer storage sections 17. More specifically, the selection means designates which of the pulse generators will be activated. A corresponding change is made in adjusting the threshold of each tag recognition circuit 10 to operate with fewer or more storage elements.

A storage section 17 is defined as an integral closed hard axis portion of a storage element 3, which portion is substantially positioned under a respective perturb line 15. A write means, not shown, is aligned also with the lines 8 and 15, and is completely described in a U.S. patent application Ser. No. 570,369 filed Aug. 4, 1966, and assigned to the assignee of the present invention. A row of such sections 17 is defined as those sections associated with a single perturb line 15, and a column of such sections 17 is defined as those sections in the various rows associated with a single branch line 8. A column of sections 17 represents the tag portion 9 of a storage word and contains the tag indicia identifying that word. In the figures of the present patent application, each of the storage sections 17 is further represented by an arrowhead 20, and the direction of the arrowhead indicates the magnetic state of that element. An upwardly directed arrowhead represents a binary one and a downwardly directed arrowhead represents a binary zero.

Each tag recognition circuit 10 comprises a threshold amplifier 22 and a second pulse generator 24 responsive to the output of the amplifier. A second perturb line 25 is connected to a respective generator 24 and overlays the storage sections 17 comprising a data word 26. The perturb line 25 is positioned with respect to its respective storage elements 3 in the same manner as a perturb line 15. The threshold for the amplifier 22 is set depending on the number of storage sections 17 associated with a tag portion 9. In another embodiment, the circuit 10 includes a threshold level adjustment means 28 for incrementally increasing or reducing the threshold for each amplifier when a "closest match" type search operation is being performed. For the embodiment shown, this threshold is a current level.

A second microwave transmission network 30 comprises a second microwave distribution line 32 extending from the line 7 and a plurality of sense lines 34. Each of the sense lines 34 threads a column of sections 17 in the second plurality of elements 3 and terminates in a sense amplifier circuit 36 such as a standard diode detector.

In operation, the oscillator 5 is furnishing a stable microwave signal to its main transmission line 6 and to its distribution line 30. The passage of microwaves down the branch lines 8 and the sense lines 34 has reached a constant state and the respective circuits 22 and 36 are in a quiescent condition. The desired tag information is now applied to the tag input circuit 11 and respective pulse generators 14 generate a positive polarity pulse or a negative polarity pulse in response to a binary one or a binary zero input respectively from respective storage positions 13 in the register 12. The pulses traveling down the first perturb lines 15 generate magnetic fields which coact with the stable magnetization vectors 20 in the storage sections 17, thus causing an incremental change in the level of microwaves traveling down the branch lines 8. For those sections 17 which have a magnetization vector 20 representing the opposite binary indicia from that represented by a corresponding polarity of the perturb pulse, there is an increase in the level of microwaves passing through the respective section 17 since there is a decrease in absorption of that element. For those sections 17 which have a magnetization vector 20 representing a same binary indicia as that represented by the polarity of the perturb pulse, there is a decrease in the level of microwaves passing through the respective section 17 since there is an increase in absorption of that element. By inspection of FIG. 1*a*, it can be seen that a tag portion *9c* contains the tag indicia fully responsive to the contents of the register 12. The respective amplifier 22 either is equipped with a fixed threshold level suitable for four incremental increases or is responsive to the variable current source circuit 28 for a variable threshold level suitable for the number of incremental increases desired. The one amplifier 22 which responds to the tag search operation energizes its associated pulse generator causing a read out of the respective data portion 26. In the embodiment as shown, the data portion **26*b* is interrogated. The variable current source 28 supplies a negative current pedestal to its respective amplifier 22. This pedestal is selected to prevent energization of an amplifier 22 whenever its respective tag portion 9 contains a one bit mismatch. However, this pedestal is overcome by the current addition of all incremental currents generated by a favorable comparison. The negative current pedestal set at the amplifier 22 of the present embodiment would equal approximately a minus seven hundred milliamp signal for a four bit tag word. Each favorable comparison generates approximately a two hundred milliamp signal and the remaining one hundred milliamp signal is sufficient to activate the amplifier 22**.

Figure 2:
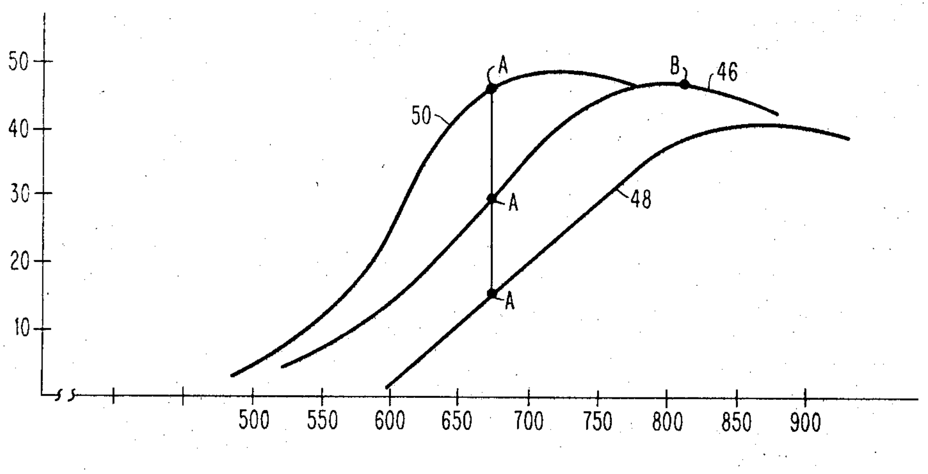
FIG. 2 is a schematic view illustrating the theory of operation of a single microwave absorption element operating in an associative memory.

Referring to FIG. 2, there is given a brief explanation of the principles of operation of a coupled hard axis thin film device operating in the microwave absorption mode of operation. FIG. 2 shows a graph having its X axis labeled megacycles per second and having its Y axis labeled in millivolts. A curve 46 shows the transmission characteristics as a function of frequency for a series of thin film elements when one film is perturbed with a three volt, five nanosecond pulse. The resonant frequency (W) of a thin film device is given by $$W=\gamma[4M_S(H_K+H_{AP})]^{1/2}$$

where $\gamma$ is the gyromagnetic ratio;

$M_S$ is the saturation magnetization of the film;

$H_K$ is the anisotropic field built into the device during construction; and $H_{AP}$ is the field intensity due to the perturb signal.

A suitable operating point of the curve 46 is at A positioned below the maximum output point B. This operating point is achieved by having the oscillator 5 operate at six hundred seventy-five megacycles. When a positive $H_{AP}$ is applied, the resonant frequency shifts up to a second curve 48 giving increased attenuation with a consequently reduced output signal level to the amplifier 22. When a negative signal is applied, the resonant frequency shifts down to a curve 50 giving reduced attenuation with a consequently increased output signal level to the amplifier 22. A positive $H_{AP}$ is defined as resulting from a perturb pulse on a perturb line 15 or 25 generating a magnetic field parallel to the stable magnetization vector stored in a storage section 17 with which the respective perturb line is associated. A negative $H_{AP}$ is defined as resulting from a perturb pulse on a perturb line 15 or 25 generating a magnetic field anti-parallel to the stable magnetization vector stored in a storage section 17 with which the respective perturb line is associated. Since at each intersection of a perturb line 15 and 25 and its respective branch lines 8 and sense lines 34, a very small signal change is produced, therefore, a very small change in the total field intensity can be considered linear and more changes at each line intersection can be considered linear and these changes would add in linear fashion.

Figure 3:
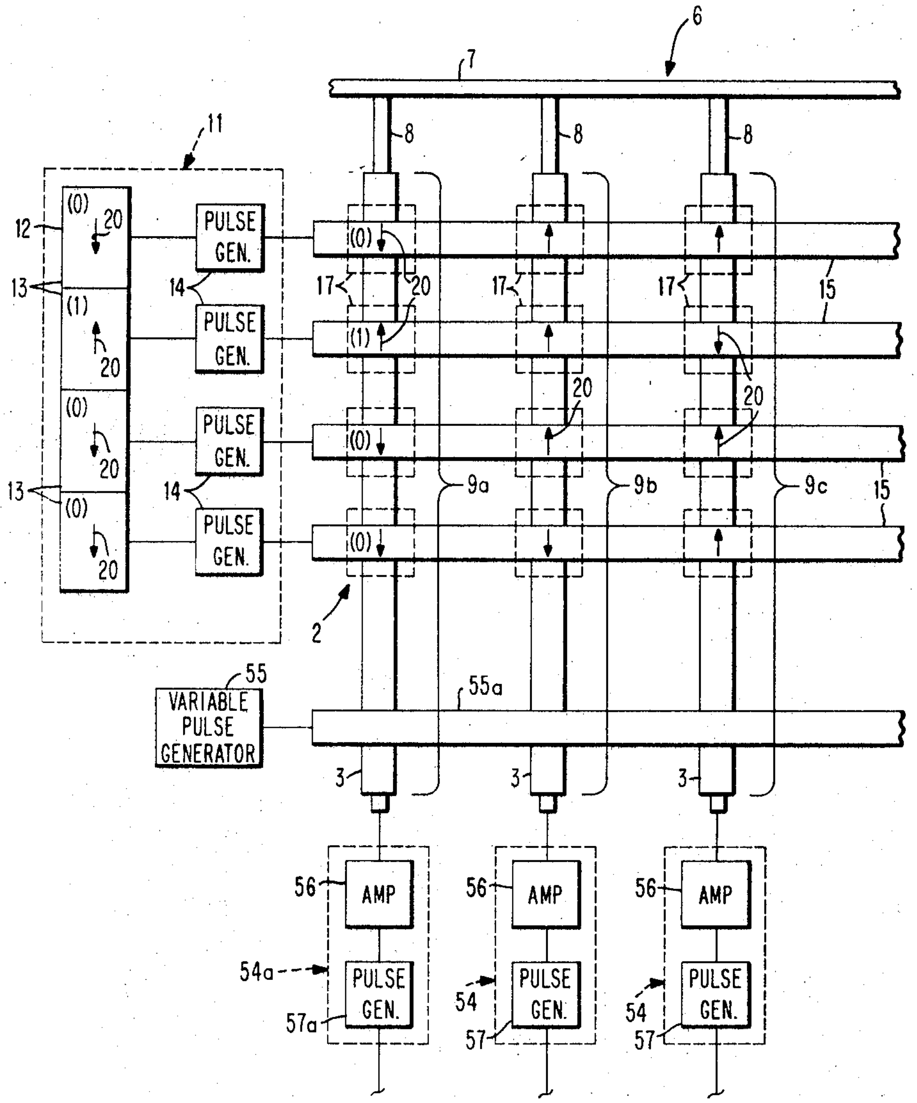
FIG. 3 is a schematic view showing the manner in which adjacent absorption elements interact.

Referring to FIG. 3, there can be seen a second embodiment of the instant invention again employing a first plurality 2 of thin film elements 3 arranged to have rows and columns of storage sections 17 and a second plurality 4 of thin film elements 3. The first plurality 2 of sections 17 are shown schematically and are employed again to store the tag indicia. The second plurality 4 are again employed to store the data portion 26 of a storage word but are not shown since it assumes the same configuration as shown in FIG. 1*b*. Each of the branch lines 8 threads a coupled hard axis thin film element 3. Such a device is completely described in the aforementioned patent application. The write mechanism, not shown, causes each storage section 17 to assume either of its two stable states.

A different tag recognition circuit 54 is shown in FIG. 3, which operates with a variable pulse generator 55 and a respective threshold perturb line **55*a* extending orthogonal to each thin film element 3. The polarity of the pulse from the generator 55 is positive so as to increase the microwave absorption at the intersection of the perturb line 55*a* with each device 3 and reduce the value of microwave energy passing that intersection or storage section 17**. This reduction is sufficient to counteract substantially the increase caused by the addition of four successful compare operations which occurred in the tag portion *9c*. The amount of the reduction changes with varying numbers of elements 17 in a portion 9. The amount of microwave energy remaining is sufficient to trigger an amplifier 56. The amplifier 56 turns on a pulse generator 57 and the remaining part of the circuit is the same as is shown in FIG. 1*b*.

The storage sections 17 are assumed to represent binary zero and binary one states as determined by the arrows 20. The register 12 is set to contain the desired tag word and each of its positions 13 represents a respective bit of the tag word as represented by the familiar arrow 20 nomenclature. The register 12 contains a tag word of 0100 in FIGS. 1, 3 and 4. The bi-directional pulse generators generate a pulse responsive to the contents of a respective position 13. A positive pulse is generated in response to a binary one state and a negative pulse is generated in response to a binary zero state. These pulses are applied to respective perturb lines 15. A positive $H_{AP}$ is generated at each storage section 17 at which there is disagreement between the direction of the arrows 20 in the register 12 and the sections 17. By inspection the right-most tag word position 9*c* contains the desired tag word. All four storage elements 17 contribute increased incremental levels of microwave energy which are added together within the line 8.

The tag word 9*b* contains three positive $H_{AP}$ signals and one negative $H_{AP}$ signal giving a resulting signal equal to only one-half the value available at tag position 9*c*. The tag word 9*a* contains one positive $H_{AP}$ and three negatives $H_{AP}$'s giving a resulting signal equal to a minus threshold level. Only the circuit 54*c* responds to the microwave signal by energizing its pulse generator 57*c* which then reads out its respective data portion 26*a* as shown in FIG. 1*b*.

Figure 4:
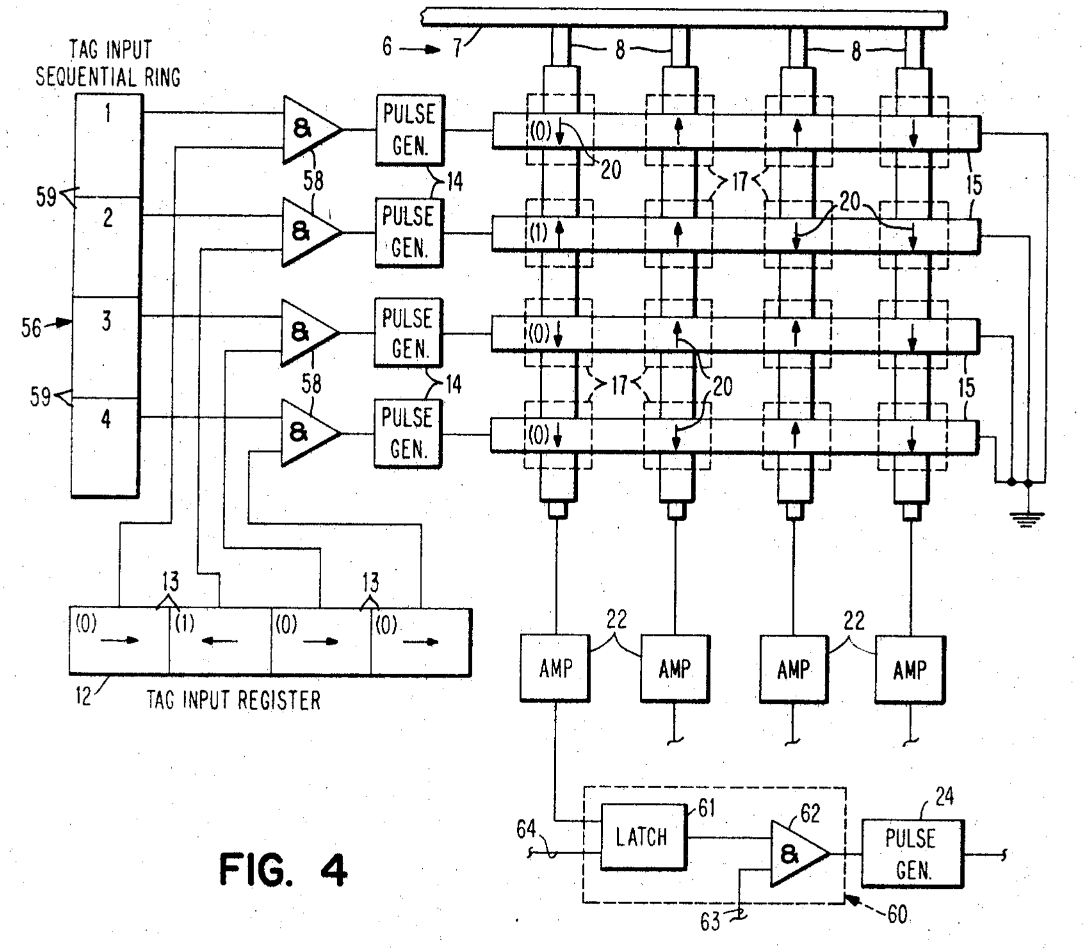
FIG. 4 is a schematic view showing a second embodiment of the instant invention.

Referring to FIG. 4, there is shown another embodiment of the present invention which additionally employs a tag input sequential ring 56 and a plurality of AND circuits 58. The AND gates 58 are placed intermediate positions 13 of the input register 12 and its respective pulse generators 14. The ring 56 is formed with a plurality of positions 59 equal to the number of storage positions 13. The AND circuits 58 have two input signals, one of which is a gating signal from a corresponding position 59 of the ring 56, and the second of which is the output signal of a corresponding position 13 of the register 12. A disabling circuit 60 comprising a latch circuit 61 and an AND gate 62 are also added intermediate the threshold amplifier 28 and the pulse generator 30.

In operation, the ring 56 sequentially gates one bit of the tag word to a respective pulse generator circuit 14. In this embodiment an $H_{AP}$ is applied simultaneously only to a row of storage elements 17, which row is associated with a single line 15. The threshold amplifiers 22 now have a threshold equal to a single negative $H_{AP}$. When the negative $H_{AP}$ causes a corresponding decrease in microwave signals reaching the amplifier 22, the latch 61 is energized and generates a disabling output signal for application to a timing AND gate 62. Each bit of the tag word is compared in the above-described fashion. At the completion of this compare operation, a timing pulse on a line 63 is applied to all AND gates 62. The one AND gate not having a disabling signal applied thereto turns on a respective pulse generator 24 to read out the respective data portion 26 of a storage word. Prior to the next compare operation all the latches would be reset by a signal as a reset line 64.

While the elements 3 have been shown as being continuous magnetic surfaces, the invention may be practiced by rising discrete elements for each section 17 shown in the figures.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an associative memory of the type wherein a word is addressable by content, a combination comprising:
- a plurality of elongated, magnetic thin film microwave elements having a resonant absorption frequency and being position in side by side relationship,
- each of said elements having a width substantially less than its length and being formed with an easy axis parallel to said length and a hard axis parallel to said width and having a first stable state characterized by a first magnetization vector positioned parallel to said easy axis and having a second stable state characterized by a second magnetization vector positioned anti-parallel to said first vector,

- a plurality of branch lines and each of said branch lines having a first end and a second end and each of said lines being associated with one of said elements,
- a signal source connected in common to each of said first ends for generating a microwave signal slightly offset below said resonant frequency,
- a plurality of threshold amplifiers and each of said amplifiers being connected to a separate branch line at said second end,
- a plurality of bipolar pulse generators for selectively generating a positive pulse and a negative pulse,
- a plurality of perturb lines positioned orthogonal to said branch lines and being slightly separated from each other and each of said lines being connected to a separate one of said generators, and
- means for selectively energizing said generators to generate a plurality of positive and negative pulses representative of the addressable content indicia.

2. The combination as recited in claim 1 and further comprising:
- means for adjusting said threshold amplifier according to the number of said perturb lines associated with one of said branch lines.

3. The combination as recited in claim 1, wherein said selective energizing means sequentially energizes said generators in a predetermined sequence.

4. In an associative memory of the type wherein a word is addressable by content, a combination comprising:
- a plurality of coupled hard axis thin film elements,
- each of said elements being formed with a bore and having a width substantially less than its length and being formed with an easy axis parallel to said length and a hard axis parallel to said width and having a plurality of sections and each of said sections having a first stable state characterized by a first magnetization vector positioned parallel to said easy axis and having a second stable state characterized by a second magnetization vector positioned anti-parallel to said first vector,
- a plurality of branch lines and each of said branch lines having a first end and a second end and each of said lines being threaded through said bore of a respective one of said elements,
- a signal source connected in common to each of said first ends for generating a microwave signal,
- a plurality of amplifiers and each of said amplifiers being connected to a separate one of said branch lines at said second end,
- a plurality of bipolar pulse generators for selectively generating a positive pulse and a negative pulse,
- a plurality of perturb lines positioned orthogonal to said branch lines and each of said lines being connected to a separate one of said generators,
- said perturb lines intersecting said branch lines at a plurality of locations and each of said locations defining a storage section of said elements, and
- means for selectively energizing said generators to generate a plurality of positive and negative pulses representative of the addressable content indicia.

5. In an associative memory of the type wherein a word is addressable by content indicia, a combination comprising,
- a plurality of coupled hard axis thin film storage sections arranged in a plurality of rows and columns,
- each of said sections having a first stable state and a second stable state,
- a source of microwave signals,
- a plurality of branch lines responsive to said source and each of said branch lines being associated with a separate column of said sections,
- tag input means for storing the addressable content indicia including a plurality of bipolar pulse generators,
- a plurality of perturb lines and each of said perturb lines being responsive to a respective one of said generators for modulating said microwave signal in each of said branch lines, and tag recognition means responsive to each of said branch lines for identifying one of said branch lines.

6. The combination as recited in claim 5 and further comprising, a second plurality of coupled hard axis thin film storage sections arranged in a plurality of rows and columns, each of said sections having a first stable magnetic state and a second stable magnetic state, a plurality of second branch lines responsive to said microwave source and each of said second branch lines being associated with a separate column of said second plurality of sections, and means responsive to said tag recognition means for interrogating said magnetic states of a row of said storage sections.

7. The combination as recited in claim 5 wherein said tag recognition means comprises, a plurality of threshold amplifier circuits and each circuit being responsive to said microwave signal on a respective one of said branch lines, and means for setting a selected threshold for said amplifier depending on the number of storage sections associated with said amplifier.

8. The combination as recited in claim 5 wherein said tag recognition means comprises, a unipolar pulse generator for generating a signal of preselected intensity, a second perturb line responsive to said unipolar generator and positioned orthogonal to said branch lines, and a plurality of amplifiers and each of said amplifiers being connected to a separate branch line.

9. The combination as recited in claim 5, wherein said tag input means further comprises, a source of tag indicia and said indicia comprising a plurality of negative bit signals and positive bit signals, a register having a plurality of storage positions and each of said storage positions storing a said single bit, and said bipolar pulse generators being responsive to a respective storage position for generating a pulse having a respective coincident polarity with the contents of said position.

10. The combination as recited in claim 9 and further including, a plurality of AND gates and each of said AND gates being positioned intermediate one of said pulse generators and its respective position in said register, a sequential gating means for generating a train of pulses and each of said pulses being available on a separate output line, and each of said lines being connected to a respective one of said AND gates.

11. In an associative memory of the type wherein a word is addressable by content indicia and said indicia comprise binary signals, a combination comprising, a plurality of coupled hard axis thin film elements arranged in a plurality of rows and columns, each of said elements being formed with a bore and having a width substantially less than its length and being formed with an easy axis parallel to said length and a hard axis parallel to said width and having a first stable state characterized by a first magnetization vector positioned parallel to said easy axis and having a second stable state characterized by a second magnetization vector positioned anti-parallel to said first vector, means for writing one of said first magnetic vectors and said second magnetic vector into each of said elements, a source of microwave signals for generating a fixed frequency microwave signal at a constant power level, a plurality of branch lines responsive to said source and each of said branch lines being associated with a separate column of said elements and being employed to conduct an equal fractional portion of said signal, tag input means for storing the addressable content indicia including a plurality of bipolar pulse generators and each of said generators responsive to one of the binary signals for generating a perturb signal having the same polarity as its respective binary signal, a plurality of perturb lines positioned orthogonal to said branch lines and each of said perturb lines being responsive to a respective one of said generators and being associated with a respective row of said elements for modulating said microwave signal in each of said respective branch lines, said modulation increasing the power level of said microwave signal with agreement between said polarity of said perturb pulse and said magnetic vector and decreasing the power level of said microwave signal with disagreement between said polarity of said perturb pulse and said magnetic vector, and tag recognition means responsive to each of said branch lines for identifying one of said branch lines.

12. The combination as recited in claim 11 wherein said tag recognition means comprises, a plurality of threshold amplifier circuits, and each circuit being responsive to a predetermined microwave power level on its respective branch line.

References Cited

UNITED STATES PATENTS 3,375,503 3/1968 Bertelsen ---------- 340—174

JAMES W. MOFFITT, *Primary Examiner.*